(12) United States Patent
Takagi

(10) Patent No.: US 8,007,933 B2
(45) Date of Patent: Aug. 30, 2011

(54) VEHICLE POWER STORAGE UNIT AND VEHICLE

(75) Inventor: Masaru Takagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 734 days.

(21) Appl. No.: 12/213,349

(22) Filed: Jun. 18, 2008

(65) Prior Publication Data

US 2008/0318121 A1     Dec. 25, 2008

(30) Foreign Application Priority Data

Jun. 20, 2007   (JP) .................................. 2007-163117

(51) Int. Cl.
*H01M 2/12*          (2006.01)
(52) U.S. Cl. ................. 429/53; 429/57; 429/72; 429/82

(58) Field of Classification Search .................... None
See application file for complete search history.

(56) References Cited

FOREIGN PATENT DOCUMENTS

| | | |
|---|---|---|
| CN | 1324499 A | 11/2001 |
| CN | 2587068 Y | 11/2003 |
| JP | A-9-283106 | 10/1997 |
| JP | A-2005-71674 | 3/2005 |

*Primary Examiner* — Cynthia Lee
(74) *Attorney, Agent, or Firm* — Oliff & Berridge, PLC

(57) ABSTRACT

A vehicle power storage unit, has: a power storage assembly; a coolant for cooling the power storage assembly; a casing having a coolant inlet through which the coolant is filled into the casing and containing the coolant and the power storage assembly; a gas-discharge pipe through which gas produced by the power storage assembly is discharged from the casing to the outside of a passenger compartment or a trunk of the vehicle; and a first pressure-release valve which is provided at the coolant inlet and through which the pressure in the casing is released to the outside when gas is produced by the power storage assembly.

14 Claims, 5 Drawing Sheets

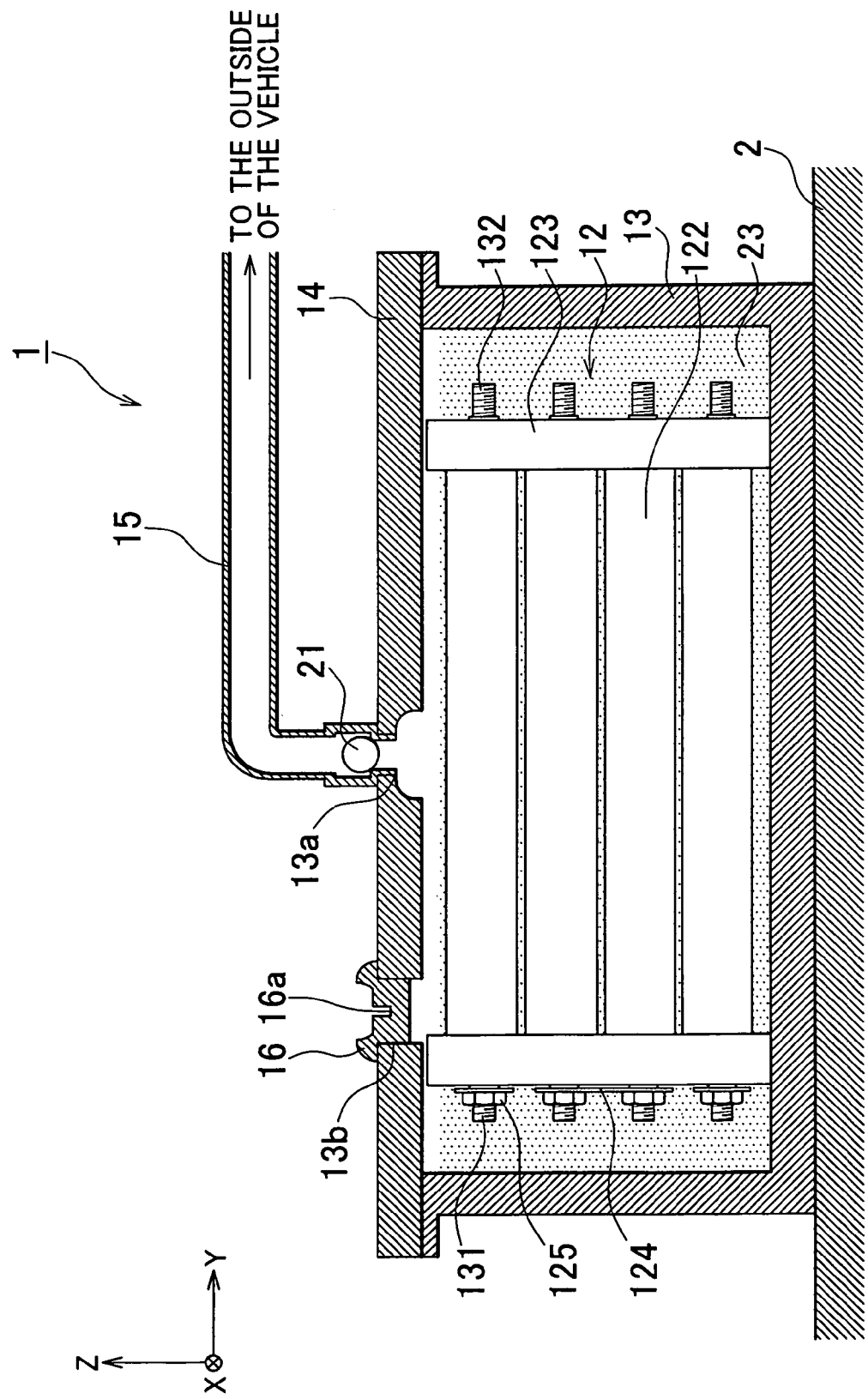

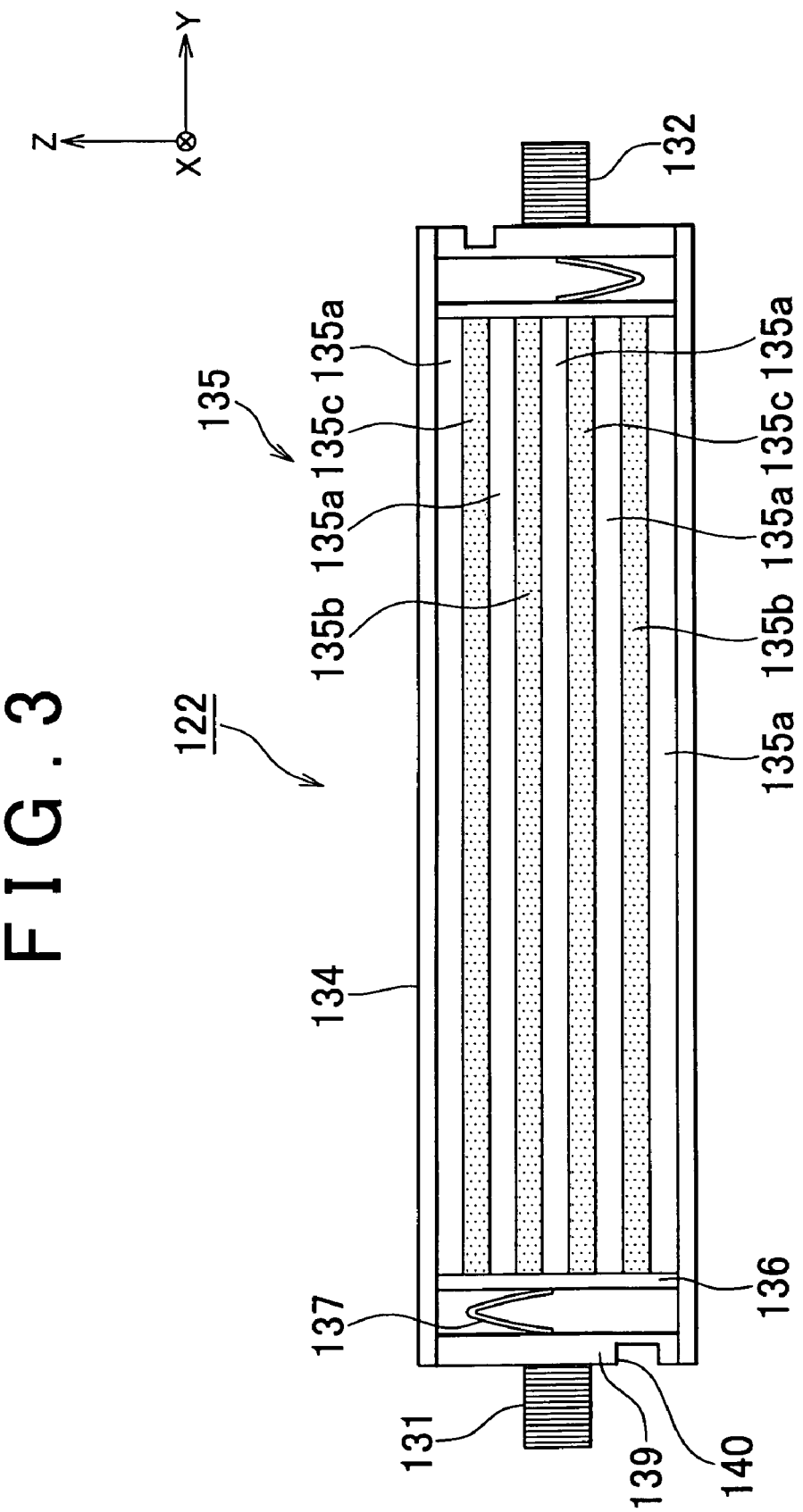

VEHICLE POWER STORAGE UNIT AND VEHICLE

INCORPORATION BY REFERENCE

The disclosure of Japanese Patent Application No. 2007-163117 filed on Jun. 20, 2007 including the specification, drawings and abstract is incorporated herein by reference in its entirety.

BACKGROUND OF THE INVENTION

1. Field of the Invention

The invention relates to a vehicle power storage unit constituted of a power storage assembly and a casing containing the power storage unit and coolant for cooling said unit. The invention also relates to and a vehicle incorporating said unit.

2. Description of the Related Art

In recent years, various motor-driven vehicles such as electric vehicles and hybrid vehicles have been widely developed, and there have been increasing demands for secondary batteries providing a high performance, a high reliability, and a high sedulity, as drive power sources or auxiliary power sources for such motor-driven vehicles.

Power sources used as the power source for propelling a motor-driven vehicle or as the auxiliary power source are required to have a high power density. As one of such power sources, there is known a power storage unit constituted of a battery assembly consisting of multiple battery cells connected in series or in parallel and a container containing the battery assembly and coolant for cooling the battery assembly. The container is constituted of a container body having an opening at the upper side and a lid covering said opening. The lid is fixed on the container using fasteners.

Typically, a gas-release valve is provided at each battery cell. This valve is used to discharge the gas produced by electric decomposition of electrolyte solution upon overcharging of the battery cell, or the like, preventing an excessive increase in the internal pressure of the battery cell.

The internal pressure of the container increases due to the gases discharged from the respective battery cells. Therefore, the compressive strength of the container needs to be high. However, if the thickness of the container is increased to increase its compressive strength, its weight increases accordingly, making the power storage unit larger in size and heavier in weight. In view of this, it is necessary to release the gas in the container to the outside.

Japanese Patent Application Publication No. 2005-71674 (JP-A-2005-71674) discloses a battery constituted of a resin case containing electrodes and electrolyte solution. A gas-discharge member is provided at the resin case to release gas, and a gas-discharge pipe for guiding gas to the outside is attached to the gas-discharge outlet of the gas-discharge member.

Based on this structure of JP-A-2005-71674, in the foregoing power storage unit, for example, a gas-discharge pipe may be connected to the lid of the container so that the gas produced by each battery cell is discharged to the outside of the container.

However, if the internal pressure of the container increases sharply due to the gas produced by the respected battery cells, the gas may not be discharged sufficiently through the gas-discharge pipe only. Therefore, the power storage unit needs to be made large in size and heavy in weight.

One option for solving this issue may be to connect two or more gas-discharge pipes to the lid. In this case, however, the manufacturing procedure of the lid becomes complicated and the production cost increases accordingly.

SUMMARY OF THE INVENTION

The invention provides a power storage unit that is simply structured to suppress an increase in the internal pressure of the power storage unit due to the gas produced by a power storage assembly.

The first aspect of the invention relates to a vehicle power storage unit, having: a power storage assembly; a coolant for cooling the power storage assembly; a casing having a coolant inlet through which the coolant is filled into the casing and containing the coolant and the power storage assembly; a gas-discharge pipe through which gas produced by the power storage assembly is discharged from the casing to the outside of a passenger compartment or a trunk of the vehicle; and a first pressure-release valve which is provided at the coolant inlet and through which the pressure in the casing is released to the outside when gas is produced by the power storage assembly.

The second aspect of the invention relates to a vehicle incorporating the vehicle power storage unit described above.

According to the invention, an excessive increase in the internal pressure of the vehicle power storage unit may be prevented by simply providing the first pressure-release valve at the coolant inlet.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 2 is a cross-sectional view of the power storage unit of the first example embodiment of the invention;

FIG. 3 is a cross-sectional view of the cylindrical battery of the first example embodiment of the invention;

DETAILED DESCRIPTION OF THE EMBODIMENTS

Figure 1:
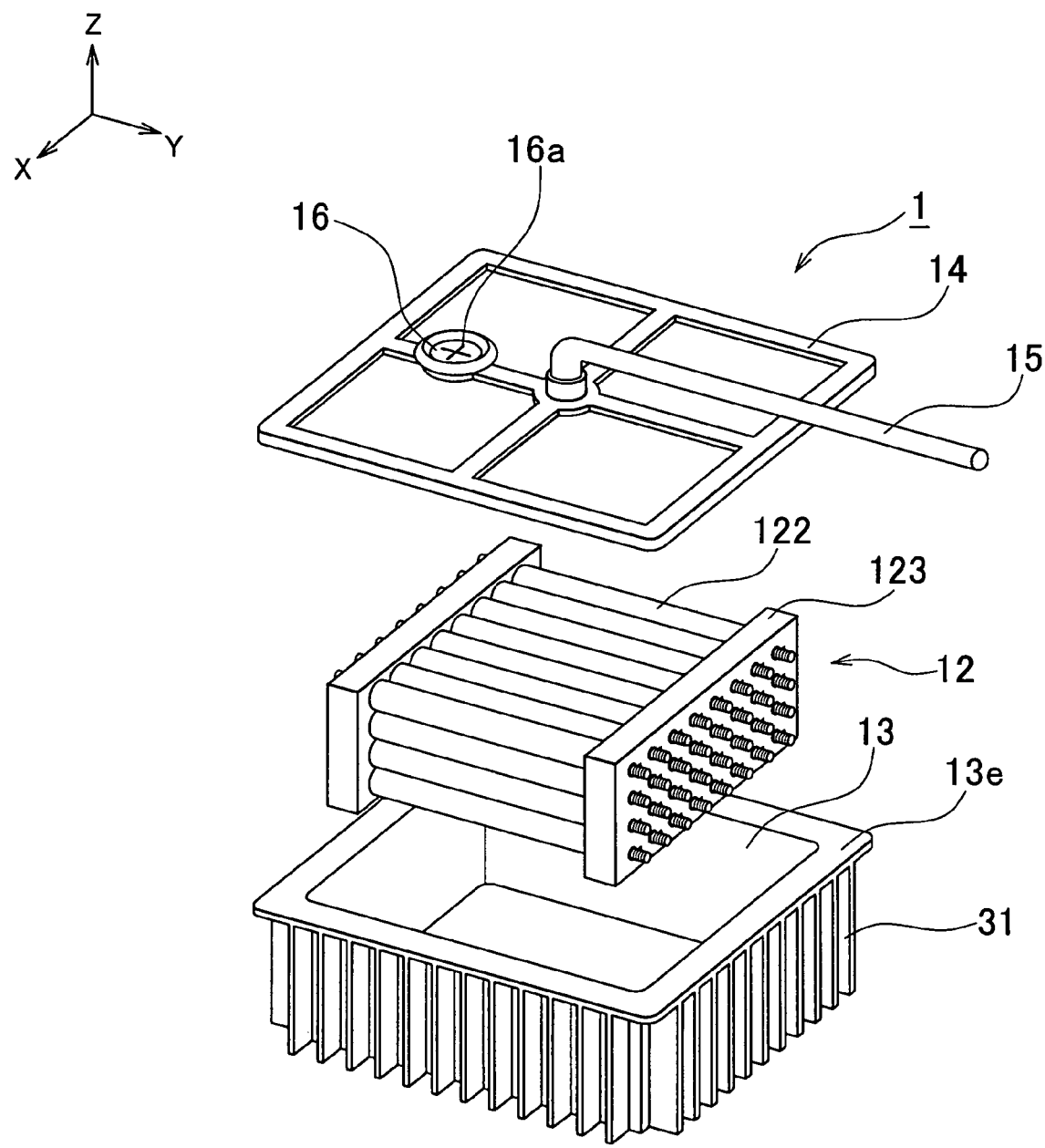
FIG. 1 is an exploded perspective view of a power storage unit of the first example embodiment of the invention.

FIG. 1 is an exploded perspective view of a power storage unit 1 according to the first example embodiment of the invention, and FIG. 2 is a cross-sectional view of the power storage unit 1. Referring to FIG. 1 and FIG. 2, the power storage unit 1 has a battery assembly 12 constituted of a plurality of cylindrical batteries 122 electrically connected to each other ("power storage assembly"), a battery case ("casing") 13 containing the battery assembly 12 and coolant 23, and a case cover ("casing") 14 serving as a lid of the battery case 13. The power storage unit 1 is used as a drive power source or an auxiliary power source for hybrid vehicles and electric vehicles. The power storage unit 1 is mounted on a floor panel 2 beneath the navigator seat in a vehicle.

The outline of the power storage unit 1 is as follows. A gas-discharge pipe ("gas-discharge pipe") 15 is connected to the immediate vicinity of the center of the battery case 13, and a gas-relief valve ("second pressure-release valve") 21 is provided at a gas outlet 13a to which the gas-discharge pipe 15 is connected.

A coolant inlet 13b is formed at the battery case 13 at a different position from the gas outlet 13a. The coolant inlet 13b is closed by a cap 16 at which a breaker valve ("first pressure-release valve") 16a is formed. The breaker valve 16a has a cross shape as viewed from above.

The gas-relief valve 21 is adapted to open at a pressure lower than the pressure at which the breaker valve 16a breaks. Note that the pressure at which each valve opens or breaks may be referred to as "valve-open pressure" in this specification. The wall thickness of the cap 16 is smaller at the breaker valve 16a than at other portions, and it breaks when the pressure in the battery case 13 reaches its valve-open pressure.

When the pressure in the battery case 13 reaches the valve-open pressure of the gas-relief valve 21 due to the gas produced by the cylindrical batteries 122 upon their overcharging, or the like, the gas-relief valve 21 opens so that the gas is discharged from the battery case 13 to the outside via the gas-discharge pipe 15.

If the internal pressure of the battery case 13 further increase after the gas discharge through the gas-discharge pipe 15 (i.e., if the increase in the internal pressure may not be suppressed by the gas discharge through the gas-discharge pipe 15), the breaker valve 16a then breaks so that the gas is discharged from the battery case 13 to the outside through the breaker valve 16a as well.

The above-described structure allows the compression strength of the battery case 13 to be low as compared to structures in which the gas may be discharged through the gas-discharge pipe 15 only. That is, the above-described structure allows the power storage unit 1 to be made smaller in size and lighter in weight.

According to the above-described structure, further, the gas-discharge capacity of the power storage unit 1 may be increased by simply forming the breaker valve 16a at the cap 16.

Next, the structure of each portion of the power storage unit 1 will be described in detail.

The battery case 13 is a box-like component having an opening at the upper side thereof. A number of radiation fins 31 are formed at the outer peripheral face of the battery case 13. The radiation fins 31 increase the area of contact with the atmosphere, facilitating the heat radiation of the battery assembly 12. Note that FIG. 2 does not show the radiation fins 31.

The battery case 13 is made of a metal having a high thermal conductivity (e.g., stainless steel).

An attachment bracket, which is not shown in the drawings, is formed at the outer peripheral face of the battery case 13, and this bracket is fixed on the floor panel 2 beneath the navigator seat, whereby the power storage unit 1 is fixed in position.

The battery assembly 12 is constituted of a plurality of the cylindrical batteries 122 that are arranged close to each other and supported by a pair of battery holders 123 facing each other. Electrode threaded shafts 131 and 132 are provided at the both ends of each cylindrical battery 122. The electrode threaded shafts 131 and 132 protrude from the respective battery holders 123. The electrode threaded shafts 131 and 132 of the respective cylindrical batteries 122 are connected in series via bus bars 124. The bus bars 124 are fixed in position by nuts 125 tightened to the electrode threaded shafts 131 and 132, respectively.

As such, because the battery assembly constituted of the cylindrical batteries 122 is used as a drive power source or an auxiliary power source for vehicles, the temperature generated at the battery assembly through its charging and discharging is high, and therefore it may fail to be cooled sufficiently if it is cooled by cooling airflow only. Thus, in the invention, for cooling the battery assembly 12, the battery assembly 12 is soaked in the coolant 23 having a thermal conductivity higher than gas.

Preferably, the coolant 23 is made of substance having a high specific heat capacity, a high thermal conductivity, and a high boiling point, not being erosive to the battery assembly 12, and having a high thermal decomposition resistance, a high air-oxidization resistance, a high electric decomposition resistance, and so on. Further, in view of preventing short-circuits between the electrode terminals, the coolant 23 is preferably insulative.

For example, the coolant 23 may be selected from among various fluorine inactive fluids including Fluorinert, NovecHFE (hydrofluoroether) and Novec1230 (Products of Minnesota Mining & Manufacturing Co. (3M)). Alternatively, the coolant 23 may be selected from among various other fluids such as silicon oils.

Next, the structure of each cylindrical battery 122 will be described in detail with reference to FIG. 3. An electrode assembly 135 is provided in a tubular battery can 134.

The electrode assembly 135 is constituted of a positive electrode 135b on the both faces of which a positive active material is applied and a negative electrode on the both faces of which a negative active material is applied, which are rolled with a separator 135a interposed therebetween. The tubular battery can 134 is filled with an electrolyte solution. Note that the electrolyte solution may be impregnated in the electrode assembly 135a.

The positive active material may be selected, for example, from various lithium-transition element composite oxides including $LiCoO_2$, $LiNiO_2$, $LiFeO_2$, $LiCuO_2$, $LiMnO_2$, $LiMO_2$ (M is at least two transition elements selected from the group consisting of Co, Ni, Fe, Cu, and Mn), and $LiMn_2O_4$. On the other hand, the negative active material may be selected from among various substances that may electrochemically adsorb and release lithium ions, such as natural graphite, synthetic graphite, cokes, burned organisms, and metal chalcogenide.

The lithium salts used as a solute of the electrolyte solution may be selected, for example, from among $LiCLO_4$, $LiCF_3SO_3$, $LiPF_6$, $LiN(CF_3SO_2)_2$, $LiN(C_2F_5SO_2)_2$, $LiBF_4$, $LiSbF_6$, and $LiAsF_6$, and the organic solvent for dissolving the lithium salts may be, for example, a solvent obtain by mixing cyclic carbonates (e.g., ethylene carbonates, propylene carbonates, vinylene carbonates, and butylene carbonates) and chain carbonates (e.g., dimethyl carbonate, diethyl carbonate, and methylethyl carbonate).

Collector plates 136, which are disc-shaped, are welded to the both longitudinal ends of the electrode assembly 135 (the both ends in Y direction). The collector plates 136 may be made from, for example, aluminum foils, stainless-steel foils, or copper foils.

The collector plates 136 are connected electrically, and mechanically, to holder plates 139 holding the electrode threaded shafts 131 and 132, respectively. Battery breaker valves 140 are formed at the respective holder plates 140 at positions different from where the electrode threaded shafts 131 and 132 are present. These battery breaker valves 140 are formed by punching the respective holder plates 139.

When the internal pressure of the battery can 134 increases beyond a limit pressure value (e.g., 2 atmospheres) due to the gas produced therein in the event of a certain battery abnormality, the battery breaker valves 140 break so that the gas is released to the outside via the battery breaker valves 140, suppressing the increase in the internal pressure of the tubular battery can 134.

The case cover 14 is bolted to a cover attachment face 13e of the battery case 13. The resistible pressure limits of the case cover 14 and the battery case 13 are higher than 10 Mpa when they are joined together.

The gas outlet 13a is formed at the center of the case cover 14 as viewed from above, and the gas-discharge pipe 15 is connected to the gas outlet 13a to discharge gas to the outside. The gas outlet of the gas-discharge pipe 15 is connected to a quarter trim of the vehicle (located outside of the passage compartment), which is not shown in the drawings.

The gas produced in the event of a battery abnormality moves upward (in Z direction) in the battery case 13. Therefore, by connecting the gas-discharge pipe 15 to the case cover 14 as mentioned above, the gas may be discharged at a relatively high rate.

The gas-relief valve 21 is provided at the joint between the gas-discharge pipe 15 and the gas outlet 13a. The gas-relief valve 21 opens in response to the internal pressure of the battery case 13 reaching the valve-open pressure of the gas-relief valve 21 so that the gas in the battery case 13 is discharged to the gas-discharge pipe 15. Note that preferably the valve-open pressure of the gas-relief valve 21 is set to 1 to 5 Mpa.

On the other hand, the gas-relief valve 21 remains closed as long as the internal pressure of the battery case 13 is lower than the valve-open pressure of the gas-relief valve 21 (i.e., as long as there is no battery abnormality). As such, the battery case 13 has a closed structure preventing foreign matter from entering the battery case 13 from the outside of the vehicle via the gas-discharge pipe 15, whereby the insulation of the coolant 23 is maintained.

The coolant inlet 13b is formed at the case cover 14 at a position different from where the gas outlet 13a is provided. The coolant 23 is filled into the battery case 13 via the coolant inlet 13b.

The coolant inlet 13b is closed by the cap 16 whereby the coolant 23 is hermetically enclosed in the battery case 13. The breaker valve 16a having a cross shape as viewed from above is formed at the cap 16. The breaker valve 16a breaks in response to the internal pressure of the battery case 13 reaching the valve-open pressure of the breaker valve 16a, so that the gas is discharged from the battery case 13 to the outside via the breaker valve 16a. Preferably, the valve-open pressure of the breaker valve 16a is set to 1 to 10 Mpa. Like the battery breaker valves 140, the breaker valve 16a is formed by punching.

As such, the valve-open pressures of the gas-relief valve 21 and the breaker valve 16a are set lower than the resistible pressure limit of the battery case 13, and in the event of a battery abnormality, gas is discharged from the battery case 13 via these two different passages. Thus, the internal pressure of the battery case 13 may be reliably reduced before it reaches the resistible pressure limit of the battery case 13.

The above-described structure allows the strengths of the battery case 13 and the case cover 14 to be relatively low and thus allows the power storage unit 1 to be made more compact in size and lighter in weight. Further, because the breaker valve 16a is formed at the cap 16, the manufacturing process of the case cover 14 is simpler than it is when the breaker valve 16a is formed at the case cover 14.

Next, a detailed description will be made of how gas is discharged from the power storage unit 1.

When the internal pressure of the battery case 13 reaches the valve-open pressure of the gas-relief valve 21 due to the gas produced by the cylindrical batteries 122 in the event of a battery abnormality, the gas-relief valve 21 opens so that the gas is discharged to the gas-discharge pipe 15 via the gas outlet 13a.

If the internal pressure of the battery case 13 further increases and then reaches the valve-open pressure of the breaker valve 16a after the gas discharge from the gas-discharge pipe 15, the breaker valve 16a breaks, so that the gas is discharged from the battery case 13 to the outside via the breaker valve 16a. Conversely, if the internal pressure of the battery case 13 decreases as a result of the gas discharge from the gas-discharge pipe 15, the breaker valve 16a does not break, and therefore no gas is discharged via the coolant inlet 13b.

For example, the internal pressure of the battery case 13 may not be suppressed by the gas discharge via the gas-discharge pipe 15 alone if the amount of gas discharged from the cylindrical batteries 122 is larger than the limit gas-discharge amount of the gas-relief valve 21. In this case, the coolant 23 may be discharged together with the gas via the gas-relief valve 21, which further reduces the amount of the gas that may be discharged via the gas-relief valve 21.

In view of this, in the structure of the first example embodiment, in a case where an increase in the internal pressure of the battery case 13 may not be suppressed by the gas discharge via the gas-discharge pipe 15, the gas is discharged also via the coolant inlet 13b to suppress an excessive increase in the internal pressure of the battery case 13. This structure eliminates the need for providing two or more gas-discharge pipes 15, enabling power storage units having a high gas-discharge performance to be produced at a low cost.

Figure 4A:
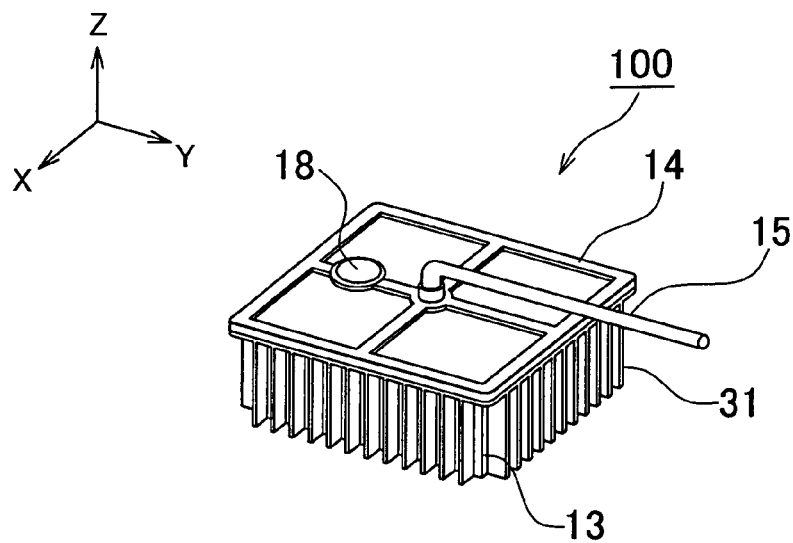
FIG 4A is a perspective view showing the state of a power storage unit of the second example embodiment before a battery abnormality.
Figure 4B:
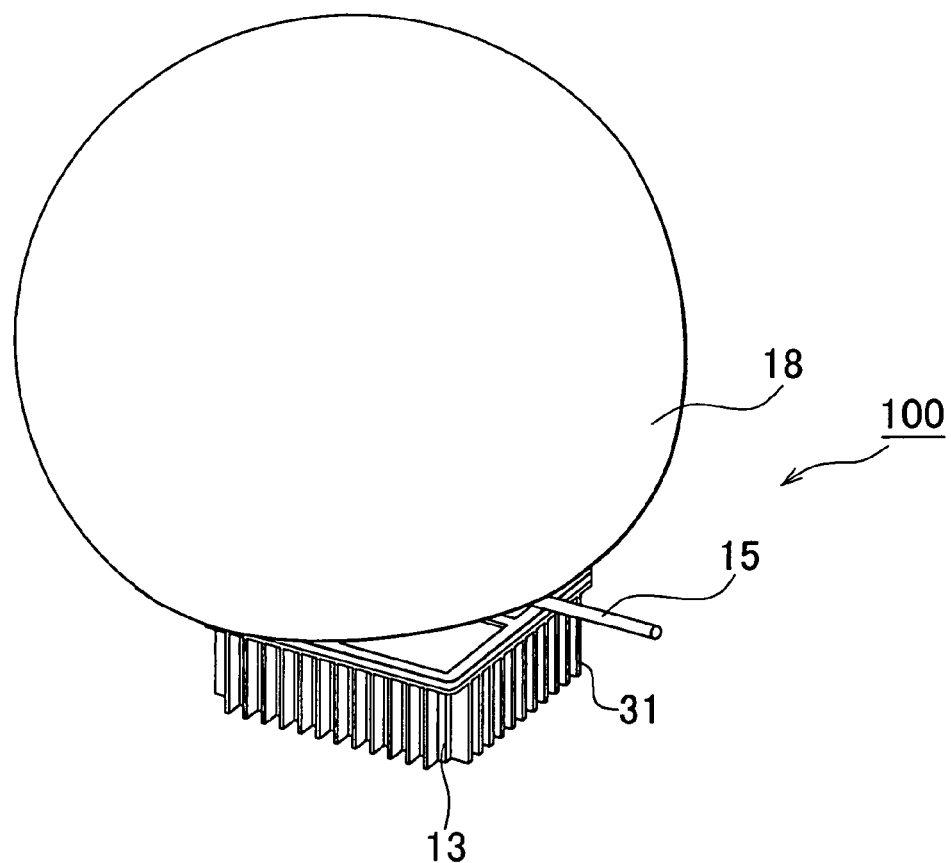
FIG. 4B is a perspective view showing the state of the power storage unit of the second example embodiment during a battery abnormality.

Next, the second example embodiment of the invention will be described with reference to FIG. 4A and FIG. 4B. FIG. 4A and FIG. 4B are perspective view of a power storage unit 100 according to the second example embodiment of the invention. More specifically, FIG. 4A shows the state of the power storage unit 100 before a battery abnormality, while FIG. 4B shows the state of the power storage unit 100 during a battery abnormality. Note that the elements of the power storage unit 100 that have functions identical to those in the first example embodiment are denoted by the same reference numerals.

In the second example embodiment, an elastic container ("container") 18 that may expand and contract is connected to the coolant inlet 13b. The elastic container 18 may be connected to the coolant inlet 13b by welding, adhesion, etc.

The elastic container 18 is made of, for example, Nylon66. In this case, for increasing the terminal resistance of the elastic container 18, chloroprene rubber, silicon rubber, or the like, may be applied to the surface of Nylon66.

According to the structure described above, the gas (and the coolant 23 in some cases) discharged from the battery case 13 via the breaker valve 16a enters the elastic container 18.

Thus, the gas and the coolant 23 discharged via the breaker valve 16a in the event of a battery abnormality are stored in the elastic container 18, thus being prevented from leaking to the periphery of the power storage unit 1.

While the gas and the coolant 23 are being discharged into the elastic container 18, the gas continues to be discharged also to the gas-discharge pipe 15. Therefore, the gas in the elastic container 18 returns to the battery case 13 via the coolant inlet 13b and then is discharged into the gas-discharge pipe 15 via the gas outlet 13a, whereby the elastic container 18 gradually contracts.

Thus, because the elastic container 18 contracts as the gas is discharged therefrom after expanding once, upon replacement of the power storage unit 1, problems such as the elastic container 18 being caught at the wall of the seat may be prevented. Thus, the power storage unit 1 may be replaced easily.

Figure 5A:
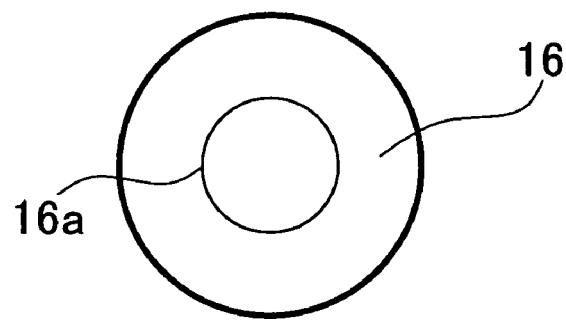
FIG. 5A is a plan view of a modification example of the breaker valve of the invention.
Figure 5B:
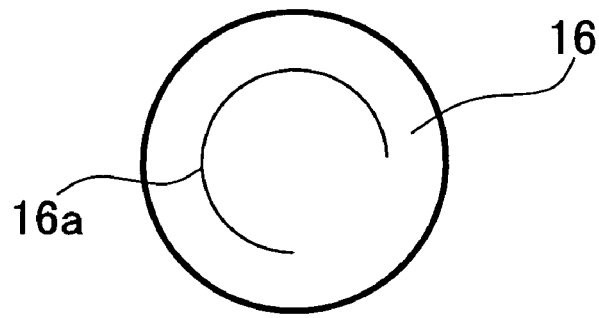
FIG. 5B is a plan view of another modification example of the breaker valve of the invention.
Figure 5C:
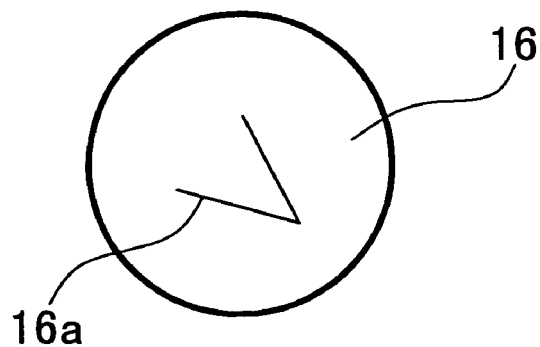
FIG. 5C is a plan view of another modification example of the breaker valve of the invention.

FIG. 5A to FIG. 5C are plan views of modification examples of the breaker valve 16a of the cap 16.

In the example embodiments described above, while the breaker valve 16a of the cap 16 is formed in a cross shape as viewed from above, the breaker valve 16a may be formed in various other shapes. In the modification example illustrated in FIG. 5A, the breaker valve 16a ("first pressure-release valve") is formed in a circular shape as viewed from above. In the modification example illustrated in FIG. 5B, the breaker valve 16a ("first pressure-release valve") is formed in an arc shape as viewed from above. In the modification example illustrated in FIG. 5C, the breaker valve 16a ("first pressure-release valve") is formed in a V-shape as viewed from above.

Further, a gas-relief valve may be provided at the cap 16, or a spring-driven automatic-return valve may be provided at the cap 16. That is, any valve may be used as long as it opens or breaks at a pressure higher than the valve-open pressure of the gas-relief valve 21 but lower than the resistible pressure limit of the battery case 13.

While the valve-open pressure of the gas-relief valve 21 is set lower than the valve-open pressure of the breaker valve 16a in the example embodiments described above, the valve-open pressure of the gas-relief valve 21 may be set higher than the valve-open pressure of the breaker valve 16a. In this case, the gas is discharged first through the breaker valve 16a, and if the internal pressure further increases, the gas-relief valve 21 opens to release the gas via the gas-discharge pipe 15. Further, the valve-open pressure of the gas-relief valve 21 and the valve-open pressure of the breaker valve 16a may be set equal to each other. In this case, the gas starts to be discharged through the breaker valve 16a and the gas-relief valve 21 at the same time.

In some cases, the coolant 23 is discharged together with the gas via the gas outlet 13a. To prevent this, a filter member may be provided at the gas-discharge pipe 15 to interrupt the flow of the coolant 23 discharged from the gas outlet 13a. In this case, the coolant 23 is prevented from leaking to the outside of the vehicle.

While cylindrical lithium-ion batteries have been used in the foregoing example embodiments, nickel-hydrogen batteries may alternatively be used or rectangular batteries may alternatively be used. Further, electric-double layer capacitors may alternatively be used. In a case where electric-double layer capacitors are used, they are alternately stacked with separators interposed in-between, and the collectors made from aluminum foils are used, activated carbon is used as the positive active material and the negative active material, and porous membranes made of polyethylene are used as the separators.

Further, a non-elastic container that does not expand nor contract may be used in place of the elastic container 18 of the second example embodiment. In this case, too, the gas and the coolant 23 may be prevented from leaking to the periphery of the power storage unit 1.

The power strobe units described above may alternatively be mounted beneath the rear seat or in the trunk of the vehicle.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A vehicle power storage unit, comprising:
    a power storage assembly;
    a coolant for cooling the power storage assembly;
    a casing having a coolant inlet through which the coolant is filled into the casing and containing the coolant and the power storage assembly;
    a gas-discharge pipe through which gas produced by the power storage assembly is discharged from the casing to the outside of a passenger compartment or a trunk of the vehicle; and
    a first pressure-release valve which is provided at the coolant inlet and through which the pressure in the casing is released to the outside when gas is produced by the power storage assembly.

2. The vehicle power storage unit according to claim 1, wherein a valve-open pressure of the first pressure-release valve is lower than a resistible pressure limit of the casing.

3. The vehicle power storage unit according to claim 2, wherein the valve-open pressure of the first pressure-release valve is 5 to 10 Mpa, and the resistible pressure limit of the casing is higher than 10 Mpa.

4. The vehicle power storage unit according to claim 1, further comprising a second pressure-release valve through which, when gas is produced by the power storage assembly, the gas is discharged to the gas-discharge pipe.

5. The vehicle power storage unit according to claim 4, wherein the valve-open pressure of the first pressure-release valve is higher than the valve-open pressure of the second pressure-release valve.

6. The vehicle power storage unit according to claim 5, wherein the valve-open pressure of the first pressure-release valve is 5 to 10 Mpa, and the valve-open pressure of the second pressure-release valve is 1 to 5 Mpa.

7. The power storage unit according to claim 1, further comprising a cap closing the coolant inlet,
    wherein the first pressure-release valve is provided at the cap.

8. The vehicle power storage unit according to claim 7, wherein the wall thickness of the cap is smaller at the first pressure-release valve than at other portions.

9. The vehicle power storage unit according to claim 1, further comprising a container into which the coolant is discharged via the coolant inlet together with the gas produced by the power storage assembly.

10. The vehicle power storage unit according to claim 9, wherein the container is an elastic container that freely expands and contracts.

11. The vehicle power storage unit according to claim 9, wherein the container is formed or structured so as to return at least one of the gas and the coolant in the container to the casing.

12. The vehicle power storage unit according to claim 9, wherein the container is heat-resistant.

13. The vehicle power storage unit according to claim 1, wherein a filter member is provided at the gas-discharge pipe to interrupt the flow of the coolant.

14. A vehicle incorporating the vehicle power storage unit according to claim 1.

* * * * *